United States Patent
Ragazzi

(10) Patent No.: US 9,358,856 B2
(45) Date of Patent: Jun. 7, 2016

(54) SYSTEM OFF CONFIGURATION FOR CLIMATE CONTROL SYSTEM

(71) Applicant: Ford Global Technologies, LLC, Dearborn, MI (US)

(72) Inventor: Franco Ragazzi, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 253 days.

(21) Appl. No.: 14/045,546

(22) Filed: Oct. 3, 2013

(65) Prior Publication Data

US 2015/0096313 A1    Apr. 9, 2015

(51) Int. Cl.
*B60H 1/00*    (2006.01)
*B60H 1/22*    (2006.01)

(52) U.S. Cl.
CPC ........ *B60H 1/00485* (2013.01); *B60H 1/00921* (2013.01); *B60H 1/22* (2013.01); *B60H 2001/00928* (2013.01)

(58) Field of Classification Search
CPC .. B60H 1/00485; B60H 1/00921; B60H 1/22; B60H 2001/00928
See application file for complete search history.

(56) References Cited

U.S. PATENT DOCUMENTS

| | | | |
|---|---|---|---|
| 3,698,838 A | 10/1972 | Holdsworth | |
| 4,838,037 A | 6/1989 | Wood | |
| 5,435,145 A | 7/1995 | Jaster | |
| 5,678,761 A * | 10/1997 | Ikeda ............... | B60H 1/00007 237/12.3 A |
| 6,351,959 B1 * | 3/2002 | Hirota ............... | B60H 1/00485 62/198 |
| 6,422,308 B1 * | 7/2002 | Okawara .......... | B60H 1/00878 165/202 |
| 7,003,975 B2 * | 2/2006 | Feuerecker ...... | B60H 1/00914 62/278 |
| 2002/0035843 A1 * | 3/2002 | Kampf ............. | B60H 1/00328 62/231 |
| 2002/0095943 A1 * | 7/2002 | Hatakeyama ..... | B60H 1/00007 62/324.1 |
| 2004/0011068 A1 * | 1/2004 | Hatakeyama ..... | B60H 1/00849 62/228.1 |
| 2004/0148953 A1 * | 8/2004 | Kurata ............. | B60H 1/00735 62/244 |
| 2004/0177628 A1 * | 9/2004 | Kurata ............. | B60H 1/00914 62/160 |
| 2006/0266074 A1 * | 11/2006 | Groll ............... | F25B 1/10 62/510 |
| 2007/0193290 A1 * | 8/2007 | Ebara ............... | B60H 1/00885 62/238.6 |
| 2009/0173094 A1 * | 7/2009 | Taguchi ........... | F04B 27/1804 62/228.5 |
| 2009/0193830 A1 * | 8/2009 | Yoshioka ......... | B60H 1/0005 62/239 |
| 2009/0241573 A1 * | 10/2009 | Ikegami et al. ............. | 62/238.7 |
| 2011/0016896 A1 | 1/2011 | Oomura | |
| 2013/0014523 A1 * | 1/2013 | Kimura et al. ..................... | 62/96 |
| 2013/0340452 A1 * | 12/2013 | Kleman ............ | F25B 41/043 62/115 |

FOREIGN PATENT DOCUMENTS

| JP | 2005009434 A | 1/2005 |
|---|---|---|
| JP | 2011037428 A | 2/2011 |

OTHER PUBLICATIONS

Demma; Heat Reclaim :Benefits, Methods, & Troubleshooting, Parker Hannifin, Jan. 2007 (8 pages).

* cited by examiner

*Primary Examiner* — Emmanuel Duke
(74) *Attorney, Agent, or Firm* — Vichit Chea; Bejin Bieneman PLC

(57) ABSTRACT

A system off configuration for an automotive climate control system is provided. The climate control system includes a compressor having two downstream flow paths. The two downstream flow paths may be selectively used to provide multiple modes of operation. When the compressor moves to an off condition the valves found in each flow path immediately downstream from the compressor are closed so that a refrigerant oil blend is kept in the compressor.

15 Claims, 2 Drawing Sheets

SYSTEM OFF CONFIGURATION FOR CLIMATE CONTROL SYSTEM

TECHNICAL FIELD

This application relates to a climate control system for a vehicle.

BACKGROUND

A heat controller for controlling waste heat from an engine is disclosed in U.S. Publication 2011/0109157.

DRAWINGS

SUMMARY

Figure 1:
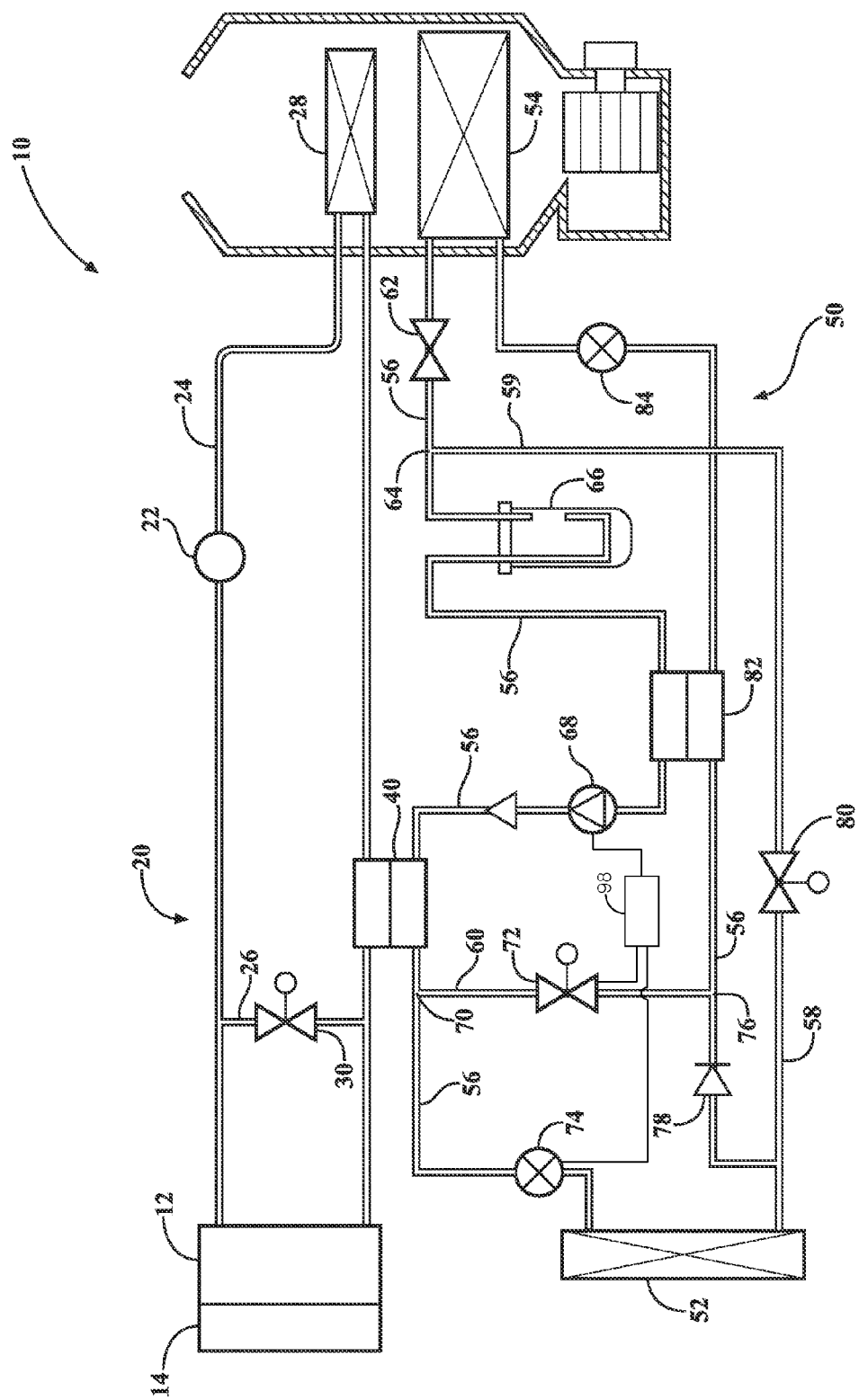
FIG. 1 is an exemplary schematic representation of a climate control system for a vehicle.

A heat pump subsystem is included in the climate control system where the heat pump subsystem includes a compressor. A refrigerant-oil blend is pressurized by the compressor into at least two downstream flow paths. Each flow path includes a valve which operatively moves to a closed position in response to an off condition. One valve may be an electric expansion valve. The term electric expansion valves includes any other mechanical expansion valve device with the capability to close based on an input signal. The other valve may be an on/off valve such as a mechanically controlled solenoid that defaults to a closed condition or some other form of valve that closes in response to a signal.

The climate control system in an exemplary embodiment may be include a vapor compression heat pump system for an automobile including an outside heat exchanger and an evaporator configured to cool or heat the interior of an automobile. The vapor compression heat pump system includes a refrigerant-oil blend flowing through a primary cooling flow line and at least one cooling shunt line downstream from the compressor. An electric expansion valve or some other mechanical expansion device with the capability to shut-off refrigerant-oil flow based on an input electrical signal is positioned downstream from the compressor. The electric expansion valve receives a process signal to move to a closed position when the compressor is in an off condition. An on/off valve located in the heat pump shunt line is also provided. The on/off valve closes in response to the compressor being in an off condition. The on/off valve may be a solenoid valve that defaults to a closed position when the compressor is turned off or in the alternate may close in response to an off signal.

A method of operating a climate control system is also provided where the vapor compression system includes a heat pump subsystem and a heating subsystem. In the method the cooling system includes a compressor operative to pressurize a refrigerant-oil blend in a plurality of downstream coolant lines including a primary refrigerant line and a shunt refrigerant line. The primary refrigerant line includes at least one electric expansion valve, or similar type valve and the shunt line includes at least one on/off valve. The method involves sending a control signal to the compressor to pressurize a refrigerant-oil blend in order to provide at least one cooling function and at least one heating function and sending an off control signal to the electric expansion valve, when the compressor is turned off, instructing the electric expansion valve to move to a closed position.

DETAILED DESCRIPTION

It is to be understood that the following disclosed embodiments are merely exemplary of the invention that is set forth in the patent claims included herein. The figures are not necessarily to scale and some features may be exaggerated or minimized to show details of particular components. Therefore, specific structural and functional details disclosed herein are not to be interpreted as limiting, but merely as a representative basis to instruct how to employ the invention described in the claims included herein.

A system off configuration for a climate control system is provided. A system off condition is affirmatively recognized by a climate control system and a compressor off signal is sent to at least one electric expansion valve to a closed position such that a refrigerant-oil blend will be maintained within a compressor associated with the climate control system rather than such valves remaining in their status quo position when the system turns off. By maintaining the refrigerant-oil blend in the compressor during an off condition the compressor may be more effectively lubricated upon the compressor turning back on. In an exemplary embodiment the electric expansion valve is positioned downstream from the compressor. In the exemplary embodiment the system further includes a refrigerant-oil shunt line including an on/off valve. In one exemplary embodiment the on/off valve is a solenoid valve that defaults to a closed position when the system is turned off. Alternately, in another exemplary embodiment the on/off valve receives the signal to move to a closed position.

Referring to the drawings where like numbers are numbered alike there is shown an exemplary schematic of a climate control system used for a vehicle, which in the exemplary embodiment is an automobile. The vehicle may have any suitable drivetrain and may include one or more power sources 12. Power source 12 may be configured as an internal combustion engine, may be a hybrid power source, an electrical or non-electrical source. Power source 12 may include a radiator 14. The climate control system 10 in the exemplary embodiment is may include a heat pump subsystem 50 and a heating subsystem 20 capable of providing multiple modes of operation.

In the exemplary embodiment thermal energy may be transferred between heating subsystem 20 and heat pump subsystem 50 through a refrigerant-oil blend to coolant heat exchanger 40. The refrigerant-oil blend includes both a refrigerant and an oil where the refrigerant provides cooling and heating functions within heat pump subsystem 50 and the oil content provides a lubrication function to the compressor.

Heating subsystem 20 includes a primary line 24 and a coolant pump 22 that circulates coolant through the heating subsystem 20 including primary line 24. In the exemplary embodiment heating subsystem 20 includes a shunt line 26 that together with valve 30 allows coolant within heating subsystem 20 to substantially bypass power source 12.

A heater core 28 associated with heating subsystem 20 may transfer thermal energy to the air in the passenger compartment of the vehicle. Heater core 28 may be located in the passenger compartment of a vehicle and may include a suitable ventilation subsystem.

The climate control system 10 may also include a heat pump subsystem 50 that may transfer thermal energy to or from the passenger compartment to or from coolant subsystem 50. Cooling subsystem 50 may include an outside heat exchanger 52 and an evaporator 54. A compressor 68 circulates a refrigerant-oil through the cooling subsystem to affect the transfer of thermal energy. Heat pump subsystem 50 includes a primary refrigerant-oil line 56, a recirculation refrigerant-oil line 58 and a refrigerant-oil shunt line 60. Primary refrigerant-oil line 56 connects evaporator 54 to outside heat exchanger 52 and provides a primary flow path between the two. Refrigerant-oil flows from evaporator 54 through a pressure regulator 62 past a first node 64 through an accumulator 66 and into compressor 68. First node 64 connects primary refrigerant line to a downstream section 59 of refrigerant recirculation line 58.

Refrigerant-oil flows downstream from compressor 68 through coolant heat exchanger 40 past a first shunt node 70 through an electric expansion valve 74 and into outside heat exchanger 52. First shunt node 70 connects primary refrigerant-oil line 56 to refrigerant-oil shunt line 60. Refrigerant-oil shunt line 60 includes an on/off valve 72 that controls whether refrigerant flows into refrigerant-oil shunt line 60. On/off valve 72 may be a solenoid valve or a valve controllably movable between an open and closed position in response to a control signal. If on/off valve 72 is a solenoid valve it is selected such that when the climate system is turned off the solenoid defaults to a closed position.

Shunt line 60 connects to primary refrigerant-oil line 56 through a shunt/recirculation node 76. When refrigerant-oil is flowing through shunt line 60 and into primary refrigerant-oil line 56, a check valve 78 prevents refrigerant from flowing back into outside heat exchanger 52. Refrigerant-oil recirculation line 58 of heat pump subsystem 50 provides a path for refrigerant-oil to flow that bypasses evaporator 54. An on/off valve 80 is positioned within refrigerant-oil recirculation line 58. On/off valve 80 is operative to selectively engage refrigerant-oil recirculation line 58.

As shown in the exemplary embodiment an internal heat exchanger 82 is provided that may transfer thermal energy between the upstream side of the primary refrigerant-oil line 56 and the downstream side of the primary refrigeration-oil line. Before the primary refrigerant-oil line enters evaporator 54 it passes through a second electric expansion valve 84.

Co-pending U.S. Ser. No. 14/010,057, which is incorporated herein by reference in its entirety, describes a climate control system similar to climate control system 10 that may provide a variety of different flow paths by controlling first and second electric expansion valves along with on/off valves in order to deliver a variety of different modes including by way of non-limiting examples a heating mode, cooling mode, multiple de-humidification modes and a mode to de-ice the outside heat exchanger.

Figure 2:
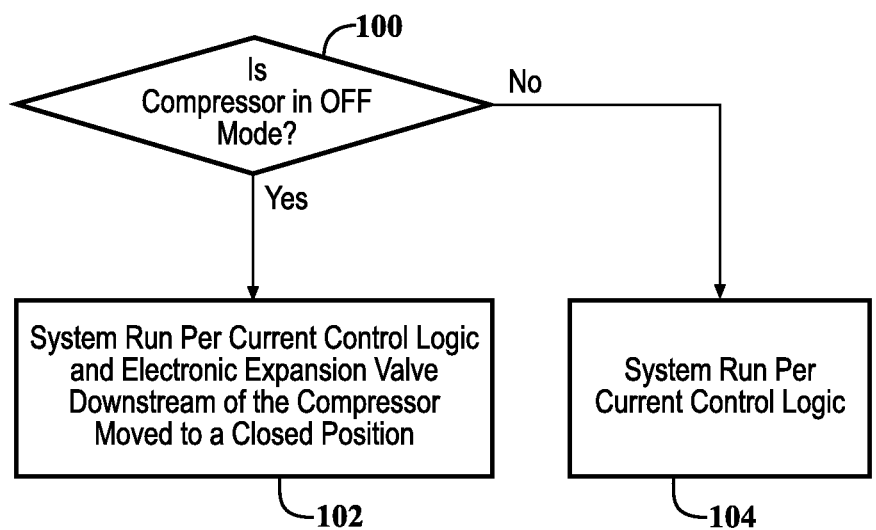
FIG. 2 is a block diagram of an exemplary process for controlling a system off condition of a climate control system.

With reference to FIG. 2 there is shown an exemplary process flow chart relative to affirmatively utilizing a system off condition in the climate control system. In particular when the climate control system determines whether the compressor is in an off condition at 100. If the compressor is not in an off mode at 100 a processor 98 (shown in FIG. 1) operates with a control logic as set forth, for example in co-pending application Ser. No. 14/010,057 to provide normal operation at 104. When the system is moved into an off position at 100 the processor 98 signals the first electric expansion valve 74 positioned downstream from compressor 68 to move it to a closed position at 102. If on/off valve 72 is configured to receive a control signal it too will receive an off signal to instruct first on/off valve to a closed position at 102. In an alternate exemplary embodiment when on/off valve 72 is a solenoid valve it is selected such that when the compressor is turned off the on/off valve 72 defaults to a closed position and only electric expansion valve 74 is instructed to move to a closed system.

Affirmatively recognizing an off condition and signaling downstream electric expansion valve 74 to close and providing an on/off valve in shunt line 60 that also closes allows refrigerant-oil to not leak out of compressor 68 when compressor is off. Refrigerant-oil flow out of compressor 68 may occur due to pressure differentials caused by, for example temperature differentials. Providing a mechanism that affirmatively signals valves immediately downstream of a compressor in a climate control system to move to a closed position may reduce the number of check valves needed in a climate control system. Elimination of check valves may increase compressor efficiency by reducing parasitic pressure loses associated with check valves.

It is understood that while the present exemplary embodiment includes two downstream valves, electric expansion valve 74 and on/off valve 72 other climate control systems may include less than or more than two valves. In the case where a system includes more than two valves, each valve would be instructed to move to a closed position so as to maintain the refrigerant in the compressor.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A heat pump subsystem for an automobile comprising:
a compressor including at least two downstream flow paths each flow path including a valve, the valves movable between an open position and a closed position, and the valves moving to a closed position in response to a compressor off condition.

2. The heat pump subsystem as in claim 1 wherein at least one of the valves is an electric expansion valve movable between a plurality of positions.

3. The heat pump subsystem as in claim 2 wherein at least one of the valves is an on/off valve.

4. The heat pump subsystem as in claim 3 wherein the on/off valve is a solenoid valve that defaults to a closed condition when the compressor is turned off.

5. The heat pump subsystem as in claim 3 wherein the two flow paths include a primary refrigerant-oil line and a shunt refrigerant-oil line.

6. The heat pump subsystem as in claim 5 wherein the on/off valve is located in the shunt refrigerant-oil line.

7. The heat pump subsystem as in claim 6 further thermally connected to a heating subsystem through a refrigerant-oil to coolant heat exchanger to define a climate control system.

8. The climate control system as in claim 7 further comprising a coolant pump.

9. The climate control system as in claim 8 operative to provide at least one cooling mode and at least one heating mode.

10. A climate control system for an automobile comprising:
- a heating subsystem including a heater core, the heating system including a coolant and operative to transfer thermal energy into the interior of the vehicle;
- a heat pump subsystem operatively connected to the heating subsystem by a heat exchanger; the heat pump system including a compressor operative to create refrigerant-oil flow in a primary refrigerant-oil line between an outside heat exchanger and an evaporator; the heat pump subsystem including at least one electric expansion valve positioned downstream from the compressor;
- the electric expansion valve operative to receive a process signal so that the climate control system is capable of providing at least two modes of operation; the electric expansion valve movable to a closed position in response to a process signal indicating that the compressor is in an off position; and
- a downstream refrigerant-oil shunt line where the refrigerant shunt line includes an on/off valve that moves to a closed position when the compressor is off.

11. The climate control system as in claim 10 wherein the on/off valve is a solenoid valve that is configured to move to a closed position as a default upon a system off setting.

12. The climate control system as in claim 11 further comprising a processor, wherein the processor sets an internal system flag in response to an off position of the compressor and sends a signal to the electric expansion valve signaling the electric expansion valve to move to a closed condition.

13. The climate control system as in claim 10 further comprising a processor, wherein the processor sets an internal system flag in response to an off position of the compressor and sends a signal to the electric expansion valve signaling the on/off valve to move to a closed position.

14. A method of operating a climate control system; a vapor compression system including a heat pump subsystem and a heating subsystem; the heat pump subsystem including a compressor operative to pressurize refrigerant in a primary refrigerant line, the primary refrigerant line including at least one electric expansion valve positioned downstream from the compressor, and a downstream shunt line having an on/off valve, the vapor compression system configured to provide at least one heating function and at least one cooling function, the method comprising;
- sending a control signal to the compressor to pressurize a refrigerant in order to provide the at least one cooling function;
- sending an off control signal to the electric expansion valve instructing the electric expansion valve to move to a closed position in response to the compressor moving to an off position; and
- the on/off valve moving to a closed position in response to the compressor turning off.

15. The method as in claim 14 further comprising sending a control signal to the on/off valve instructing the on/off valve to move to a closed position in response to the compressor moving to an off position.

* * * * *